W. G. CUMMINS.
Tailor's Measure.

No. 102,505.

2 Sheets—Sheet 1.

Patented May 3, 1870.

Witnesses:

Inventor:

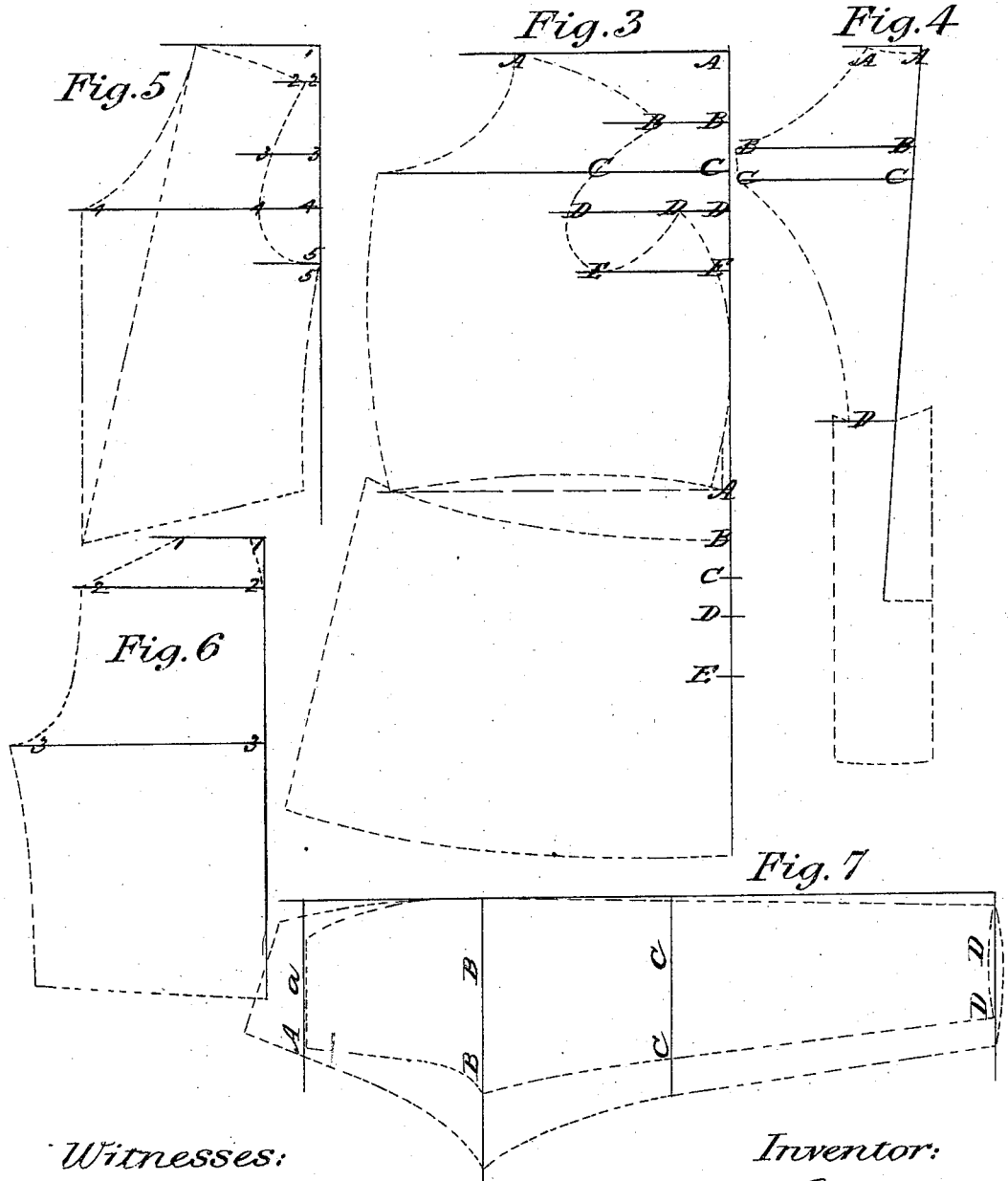

UNITED STATES PATENT OFFICE.

WILLIAM G. CUMMINS, OF CIVIL DISTRICT NO. 10, TENNESSEE.

IMPROVEMENT IN TAILORS' SCALES.

Specification forming part of Letters Patent No. 102,505, dated May 3, 1870.

*To all whom it may concern:*

Be it known that I, WILLIAM G. CUMMINS, of Civil District No. 10, in the county of Jackson and State of Tennessee, have invented a new and Improved Tailor's Scale; and I do hereby declare that the following is a full, clear, and exact description thereof, which will enable others skilled in the art to make and use the same, reference being had to the accompanying drawings, forming part of this specification.

This invention relates to improvements in scales for measuring and laying out the several parts of men's clothes for cutting, whereby it is designed to provide a simple arrangement of the same adapted to all the parts of the different garments under a system that may be easily learned and used by persons little skilled in the art.

Figure 1:
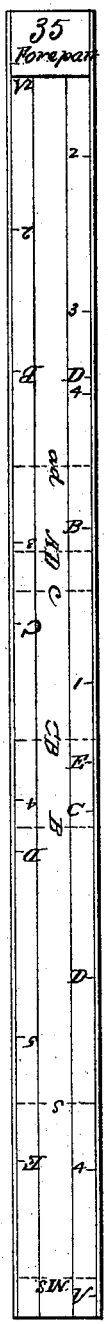
Figure 2:
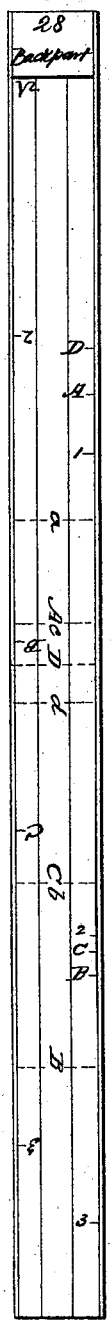

Figure 1 represents a plan view of one side of my improved scale. Fig. 2 represents a similar view of the other side; and Figs. 3 to 7 represent diagrams of several parts of garments, showing the method of using the scale.

My scale is not flexible; is not applied directly to the person; does not supersede the use of a tape-measure. The design of my scale is to give by an easy alphabetical application those points which determine the form of garments, and which cannot be readily and correctly obtained by a direct measurement of the person, especially by unskilled ladies. The letters and figures (except at heading) simply designate distances from the base-line of the scale to the points at which they are placed. The base-line of scale is the line across the scale immediately under the words "Backpart" and "Forepart." (See Sheet 1, Figs. 1 and 2, of drawings.) The spaces above named, and not those between the letters, necessarily give the controlling-points in my drafts. I divide the garments into two grand divisions of back part and fore part. I also divide the scale into two grand divisions of back part and fore part, one occupying one side of the scale and the other occupying the other side. Each of these divisions I subdivide into three distinct departments, thereby keeping the spaces or distances that give the points on the primary base-lines separated from those that give the points on the secondary base-line. By this new arrangement I am enabled to notate my scale so that it may be applied alphabetically, and its application can hardly be forgotten by the most treacherous memory. The letters in the two outside subdivisions are used in drafting the back, fore part, and skirt of coats. The figures in those same departments draft the coat-sleeve and vest fore part and back. The upper and lower case letters in the middle department draft five different styles of pants. Different-sized persons of course require different-sized scales. The spaces or distances of the scale are proportioned to the number of inches that a person measures around the breast, or around the shoulder from large joint of neck back to beginning. The breast-measure is placed over the word "Forepart," and the shoulder-measure over the word "Backpart." (See, respectively, 35 and 28 on Figs. 1 and 2, Sheet 2.) My plan is arranged for a tight breast-measure, so that the breast is to the shoulder as five is to four, and, as a consequence, one-fourth of shoulder added to itself will give the breast or one-fifth of breast subtracted from itself will give shoulder measure. It follows, then, that the scale may be selected by either measure, or either measure may be derived from the other. In my drafts all the primary base-lines run parallel with edge or warp of cloth, except for the back of coat, which is inclined into cloth two to two and one-half inches in two feet. The secondary base-lines are struck perpendicularly to the primary ones at the points determined by application of scale and tape. Holding the heading of my scale in left hand, the right edge always applies to primary base-lines and left edge to secondary ones.

ORDER OF MEASURES TAKEN FROM PERSON.

*For frock coat.*—Scale measure, length of coat, width of coat, length of sleeve, width of sleeve: It takes two measures to give the lengths, and two to give the widths. From large joint of neck around shoulder and back to beginning is the first measure to be taken. This I call the "scale-measure," because it determines the scale. From large joint of neck down the back (the distance according to fashion) is the second. This gives length of waist from top of back. From large joint of neck down as far as fashion requires for giving the entire length of coat is the third. Around the breast, closely, near the arms, is the fourth. One-half of this measure, applied from prime base-line on secondary base-line C, gives width of breast. Around waist, reasonably tight, is the fifth. Half of this measure, applied from primary base-line, gives width of fore part at waist. From center of back to elbow is the sixth, leaving off width of back. This gives the length of sleeve from sleeve-head to point of elbow. From center of back to first joint of finger is the seventh. This gives the entire length of sleeve, width of back being left off. Around elbow, loosely, is the eighth. One-half of this gives width of sleeve at elbow, taken according to fashion. Around hand, loosely, is the ninth. One-half of this gives width of sleeve at hand. I can easily dispense with all of these but first and seventh and do good cutting, but teach my apprentices to use all nine of them. From the measures I will proceed to draft back: Select scale by first or fourth measure, (see Figs. 1 and 2, Sheet 1,) and always make drafts from the right to the left; strike primary base-line, inclining into cloth two or two and one-half inches. Use back-part side of scale for drafting back, taking heading end of scale in your left hand, standing at upper or outer end of base-line; apply it on left side of base-line near the top, and, keeping it stationary, dot at A, B, and C, alphabetically; apply second measure from top, or A; dot for waist-length. To these four points strike secondary base-lines; apply the left edge of scale to outside, top, or A line. Having base-line of scale on primary base-line, dot at A, slip scale to next line and dot at B, to next and dot at C, next at D, alphabetically. Curve from A to B, B to C, C to D, by sweeps or guides. At one inch from D strike line with warp sufficiently long; apply third measure for length, and strike bottom by square or tape. Elevate the folds and strike off near one-half inch at top of back; also strike off selvage of skirt. (See Fig. 3, Sheet 2.) Fore part: Draw primary base parallel with work. Use fore-part side of scale for drafting fore parts. Apply as in back, dotting at A B C D E, alphabetically; strike secondary base-lines to these dots; use left edge of scale, and dot on first or A line at A; move to next, and dot at B, to next and dot at C, next at both D D, next at E, completed; curve from A to B, from B to C D E D; from last D, near base-line, by tape, sweep or guide sufficiently long; measure length of side seam of back, (C D;) apply to side seam of fore part; from this dot strike a line sufficiently long for waist-line; apply one-half breast-measure (½ 35) for primary base-line on secondary base-line C for width of breast, and one-half waist-measure (½ 33) on waist-line for width of waist; curve from A to breast-dot, from breast-dot to waist-dot, from waist-dot to side-seam dot. (See Fig. 3, Sheet 2.) Skirt of fore part: Draw primary base-line parallel with warp; use fore-part side of of scale; dot at A B C D E; draw secondary base-line at A; go out on this line the width of bottom of breast plus two and one-half inches; lay corner of square at this point with long arm at C on primary base-line—if you wish plainest skirt, to D, if common skirt, to E; for extra full or wide, marking by short arm for flare; lay off this edge of skirt long enough to sew to narrow back skirt, and the other one-half inch shorter; around bottom by sweep, say, forty inches; curve top of skirt according to flare from B to width dot. Sleeve-measures 21–35–18–11, base-line straight with cloth from one to two inches from edge of cloth, or other part of garment for large sleeves; apply scale-dotting at 1 2 3, consecutively; strike transverse lines; use the right edge of scale on these also, dotting at 3 on your top or first line, 4 on your next, and 5 on the next; curve from 2, or half-way between 2 and 3, to 3, from 3 to 4, from 4 to 5; strike straight line from 5 sufficiently long; apply length on primary base-line, (21 and 35;) lay off width at hand from inside seam (½ 11) around back part for large sleeve by sweep; apply one-half elbow-measure (½ 18) for width at elbow; form under part from top part of sleeve.

*For drafting vests.*—For scale 28 or 35, length 26: Take two measures, one to select the proper scale and the other to determine the length. The same scale that cuts my customer's coat also cuts his vest and pants, and is obtained by same measures. To get length, measure from large joint of neck down before as far as fashion or wish require; leave off width of back at top. Fore part, scale 28, length 26, primary base-line straight with cloth: Use fore-part side and right edge of scale; dot consecutively at all the figures on that edge; draw secondary lines; use left edge of scale; dot consecutively at all the figures on this edge; curve from 1 to 2, 2 to 3, 4, 5; curve from 1 to 4; strike a line from this 4 straight with cloth sufficiently long; apply length (26—3½) from 1 down front, (see Fig. 5, Sheet 2;) strike off bottom, giving pitch from one and one-half to three inches; curve out under arm from one-half to one and one-half inch. Back part, primary base-line with warp or edge of cloth: Use back-part side and right edge of scale; dot consecutively at all the figures on that edge; draw secondary lines; use left edge of scale; dot consecutively at all the figures on this edge; curve from 1 to 2, 2 to 3, from this 3 sufficiently far; make some narrower than at 3; lay off right length to sew to side seam of fore part; strike off bottom and slope off one-half to three-fourths of an inch at top. Single breast, double breast, high neck, low neck, and all fashions can be easily drafted from this scale.

*Pants.*—Take breast or shoulder measure to select the scale, just as for coat and vests. Take gentleman's measure from crotch to floor for length of pant-legs; lady's measure from center of back to second joint of little finger, if arm be held straight, or to first joint if bent to a right angle at elbow, or from hip-joint to top of foot at instep. The inside or middle department of scale is used for pants. All the letters apply to the transverse or secondary base-lines except S; from base-line of scale to s gives shortest length from top or waist to crotch or seat line; to large S or M S gives medium seat length. The other letters or the spaces which they designate are all applied twice to their respective lines. The upper-case letters draft the large hussar pants; the lower-case letters draft the tight gaiter-pants; an upper and lower case letter drafts the medium pants; an upper-case and half between upper and lower the intermedium hussar; a lower-case and half between lower and upper the intermedium gaiter. Large hussar is represented by Fig. 7, Sheet 2, of drawings. In drafting the waist, use the letters to suit the form of customer; if very slender waisted, use small $a$ both times; if very large waisted, use large A both times; if medium waisted, use large and small, (A+$a$.) If desirable, make either of the intermedium waists: In laying off hips, knee, and foot, apply your letters to suit the fashion or request of customer. Having the scale for the coat, it is only necessary to take measure for length of vest and pant-legs to prepare you for cutting entire suit.

*Pants.*—Fore part, measure 28 or 35—33: Draw primary base-line straight with cloth; use fore-part side of scale; dot at base-line of scale and M S; from last dot go down entire length of scale and dot for knee; from second or seat-line dot apply length of pant-legs, (thirty-three inches;) strike secondary base-line to these dots; slope from seat-line to waist; from seat-line to foot; from this line apply $a$+A for medium waist; on seat-line B+B, on knee-line C+C, on foot-line D+D; curve from A to B, B to C, C to D, also at bottom, and you have fore part of large hussar pants. (See Fig. 7, Sheet 2.) Back part: Draw primary base-line parallel with warp; lay off as for fore part; slope from seat-line to foot and from seat-line to waist, or leave straight, as fashion may require; apply $a$+A for waist, B+B for hips, C+C for knee, D+D for foot; curve from A to B, B to C, C to D, also bottom; elevate waist one inch at side seam and four inches at back seam, and you have back part of large hussar pants. (See Fig. 7, Sheet 2.) By this scale ladies can soon learn to cut all kinds of coats, pants, and vests.

Having thus described my invention, what I desire to protect by Letters Patent is—

The tailor's scale above described, one side thereof being adapted to the front and the other to the back of the person, while the edges are respectively devoted to transverse and longitudinal measurements for coat and vest, and the central one to pants, all the divisions and subdivisions being arranged and applied as specified.

WILLIAM G. CUMMINS.

Witnesses:
JOHN CHILCUTT,
P. E. GOODWIN.